United States Patent [19]
Lawrenz

[11] Patent Number: 5,107,450
[45] Date of Patent: Apr. 21, 1992

[54] METHOD OF TESTING A NETWORK SETUP

[76] Inventor: Wolfhard Lawrenz, Waldweg 1, 3340 Wolfenbüttel, Fed. Rep. of Germany

[21] Appl. No.: 213,951

[22] Filed: Jul. 1, 1988

[30] Foreign Application Priority Data

Jul. 1, 1987 [DE] Fed. Rep. of Germany ....... 3721719

[51] Int. Cl.$^5$ ............................................. G04F 10/00
[52] U.S. Cl. .................................. 364/569; 364/550; 364/578
[58] Field of Search .................. 364/578, 579, 551.01, 364/554, 159, 514, 550, 569; 370/13, 14, 58.3; 340/825.5

[56] References Cited

U.S. PATENT DOCUMENTS

| | | | |
|---|---|---|---|
| 4,517,637 | 5/1985 | Cassell | 364/900 |
| 4,590,550 | 5/1986 | Eilert et al. | 364/200 |
| 4,739,323 | 4/1988 | Miesterfeld et al. | 340/825.5 |
| 4,750,175 | 6/1988 | Brenneman et al. | 371/22 |
| 4,802,164 | 1/1989 | Fukuoka et al. | 340/825.50 X |
| 4,831,560 | 5/1989 | Zaleski | 364/551.01 |
| 4,901,260 | 2/1990 | Lubachevsky | 364/578 |
| 4,930,093 | 5/1990 | Houser et al. | 364/551.01 |

OTHER PUBLICATIONS

"A Quick Look at LANNET II.5", Product Description from CACI, La Jolla, Calif. (no date), 22 pages.
"A Quick Look at COMNET II.5", Product Description from CACI, La Jolla, Calif. (no date), 30 pages.
"A Quick Look at NETWORK II.5", Product Description from CACI, La Jolla, Calif. (1986 and 1990 copyright notices), 28 pages.
IEEE Spectrum, Jun. 1986, 0018-9235/86/0600-0053, "Coming from Detroit: Networks on Wheels", R. K. Jurgen, pp. 53-59.
IEEE Spectrum, Oct. 1987, 0018-9235/87/100-0067, "The Automobile in 1997", J. G. Rivard, pp. 67-71, 79.
IEEE Spectrum, May 1987, Special Report: On Good Design, pp. 36-37.
Gautam H. Thaker et al., IEEE Transactions on Communications, "Interactions Between Routing and Flow Control Algorithms", vol. COM-34, No. 3, pp. 269-277, Mar. 1986.

Primary Examiner—Parshotam S. Lall
Assistant Examiner—S. A. Melnick
Attorney, Agent, or Firm—Foley & Lardner

[57] ABSTRACT

A method for testing a network setup with a plurality of computers, in particular controllers or microprocessors, the data of which is to be transmitted and, if appropriate, received over a data path and which is to be processed by a control, priority criteria being established for the competing transfer of the data on the data path. A method of testing the network setup is proposed in which data signals of the controllers or microprocessors are generated with a realistic frequency and are subjected to the priority criteria and in which it is determined after what time data of certain priority levels can be transferred over the data path.

15 Claims, 7 Drawing Sheets

Average Delay = 86 us
Standard Deviation = 23 us
Bus Load (data only) = 3.28 %
Bus Load (incl. message framing bits and ness. repet, because of errors)=5.38%
Number of Messages, Tranferred = 257
Number of Mess. which Lost Arbitration = 6
Number of Mess. Destroyed by Noise = 13
Number of Mess Excessively Delayed = 4

| SIMULATION COMMENT: 1 Mbit/s, 12 Nodes, 27 Mess. CURRENT PAGE: page number | | | |
|---|---|---|---|
| Transfer Request Time (us) | Transfer Completed Time (us) | Transfer Message (Ident.) | Comment |
| 100 | 168 | 250 | successful |
| --- | --- | --- | bus idle |
| 350 | 440 | 710 | successful |
| 370 | --- | 25 | delayed, bus busy |
| 440 | 490 | 10 | successful |
| 440 | --- | 25 | dlyd, lost arbitr |
| 490 | 610 | 25 | successful |
| --- | --- | --- | bus idle |
| 1230 | --- | 250 | destroyed, noise |
| 1260 | 1380 | 25 | successful |
| 1260 | --- | 250 | dlyd, lost arbitr |
| 1380 | 1448 | 250 | successful |

FIG. 7

METHOD OF TESTING A NETWORK SETUP

BACKGROUND OF THE INVENTION

The invention relates to a method of testing a network setup with a plurality of data generators, the data of which is to be transmitted and received among the data generators over a data path and which is to be processed by control units, priority criteria being established for the competing transfer of the data on the data path.

Such networks serve to make possible data communication between a multiplicity of computers, in particular controllers or microprocessors. In principle, in these cases each computer can receive and evaluate the data of the other computers and thereupon, if appropriate, generate new data itself. Due to the networking of the computers brought about by means of the data bus, competing states of data-transmit readiness arise, for the processing of which priority criteria are established in a protocol. If a computer at transmit readiness has to wait for a priority transmission request, the computer must defer its transmission request according to the respective protocol; with some protocols, it is necessary to switch over immediately to "receive" in order to be able to receive and, if appropriate, evaluate the data transmission with higher priority if the data transmission is intended for it.

For the design of such a network, the bandwidth of the data paths, for example a data bus, and thus the transfer rate attainable on the data path, are essential design criterion. For reasons of expense, the bandwidth should be kept as small as possible, whereas a fast data transfer requires a large bandwidth.

Thus far, the designer of these networks has no readily available aids for designing such a network. The designer is therefore reliant upon empirical values. As there is still relatively little experience available thus far, and the parameters of a network are disparate, by definition, complex and cannot be interwoven in an analytically unique manner, the network will have to be set up before it can be determined whether or not it operates in the desired way. However, at this time, this determination can only take place with respect to the macroscopic result. Thus, for example, with a network used in an automobile, the determination is made by the function the automobile which is controlled by the network. In this case, it can be determined whether the coordination, for example of a braking operation with other functions of the network control operate satisfactorily. If considerable response delays, which are attributable to a permanent or situation related overloading of the data path, are found in such cases, the entire network must be replanned and reconstructed. Setting up a network which operates in a usable manner is therefore expensive and time-consuming.

For the analysis of a completely set up network, recourse can be made, if appropriate, to logic analyzers, which can store and display on a screen the signal level progression, for example the signal applied at an interface. With a relatively complex data transfer, there are then a multiplicity of photographically recorded signal progressions available, the examination of/which is time-consuming and laborious and requires a high degree of concentration over a long period on the part of the person examining them. Such devices are, in some circumstances, also capable of transmitting certain test signals via an interface or the like in order to verify satisfactory transfer or to determine faults. These known devices are not, however, suitable aids for network planning.

SUMMARY OF THE INVENTION

The invention is based on the object of specifying a method of testing such a network setup, with which the operation of the network can be tested in detail, so that optimized network setups can be realized with less effort and less expense.

This object is achieved according to the invention in that data signals of the data generators are generated with a realistic frequency and subjected to the priority criteria, in that the data signals are supplemented by timing marks and using the timing marks, it is determined with what delay data of certain priority levels can be transferred over the data path.

The method according to the invention makes possible for the first time a testing of data transmission processes in a network of the type mentioned above. This makes it possible to test the parameters arising from the task definition for the particular network with regard to their compatibility with the desired design structures. By monitoring the data flows in the data path, the flow of data over the data path can be determined tabularly. On the other hand it is established which data were to be transmitted at a certain time, but had to be deferred due to the existing priority criteria and, possible, could not be transmitted at all due to an overloading of the data path.

A very meaningful evaluation is to determine statistically for the data of a certain priority level what percentage of this data has, after a certain time, been successfully transmitted, and thus processed by the other data generators as receivers.

The method according to the invention can be used very expediently in several development phases of a network. The first use is already possible when the network has not been set up in terms of hardware. In this case, according to the invention, the data signals are generated in a simulated manner and subjected to the priority criteria applying in the network. In this way, the evaluations mentioned above can already be performed realistically to a certain extent, so that it can be determined whether the envisaged design concept for the network is likely to be operational or not. Herein it can be determined whether data signals generated by a number of data generators, (measuring points) with planned frequency, pass in the desired response time to the other data generators or receivers, so that they can be processed there and the system can respond to the new data. In this evaluation, it can therefore be determined whether the envisaged data path bandwidth is adequate or, possible, overdimensioned, and it can also be determined whether the data required for the envisaged control are generated with the necessary frequency and are transmitted with the matching priority parameters.

In this complete simulation, it is expedient to simulate disturbing effects which can come into play in the real system, This can happen, for example, by disturbances being processed as signals with the highest priority. In this case, preferably a stochastic generation of signals is provided, the frequency of which per unit of time should correspond approximately to the frequency of the occurrence of disturbances in the real case. Since the error-free transfer of data signals is not possible when disturbing signals occur, the disturbing signals have a direct influence on the evaluation of the processes on the data path according to the invention.

The complete simulation of data generated by the data generators and of the decision making and transfer processes in the intended network already makes possible a good approximation of the network design to the optimum state.

A further check with the method according to the invention can be carried out in an advantageous way if the transmission network is set up with the data path and the interfaces for the data generators and receivers and the work of the computers, i.e., generation of the data signals and execution of the decision making processes, is simulated. Such a system already allows checking the disturbances created in real conditions. In this context, the physically best type of transfer path and its link up and technical activation in a disturbed environment can be tested and optimized. The data transferred on the data bus must in this case be conditioned in order to make possible the desired statistical evaluation.

The data transmission in the real network usually takes place at such a high transfer rate that an evaluation by the real time method is not possible or is only possible with a great effort. In order to keep the effort of evaluation low, the evaluation is performed at a lower rate. With the complete simulation mentioned above, this is not problematical since the transfer processes can be simulated on a different time scale, more or less in slow motion. For the evaluation of the network set up in terms of hardware, it is expedient to use a transfer section at the transition to the evaluation unit memories, by which the evaluation of the data signals takes place at a much slower rate compared with real time. The result of this is that a certain period of time elapses after completion of the transfer processes until the evaluation has taken place. Typical first-in-first-out memories are suitable as memories.

For synchronization of the mutually independently operating transmitters and receivers of a network, a synchronized timing clock has to be derived from the data signals taken. For this purpose, the data is preferably provided with an additional bit, which acts as a timing clock (bit stuffing). In this case, each nth bit can have an edge change, which is used as the timing clock signal. However, other clock recovery methods can also be used.

Checking with the network set up only in the transfer section allows verification of the results which have been obtained in the complete simulation. If appropriate, the checking according to the invention with the partially set up network leads to modifications which are still possible on account of the partial setup. These modifications may become necessary, for example, due to a differently predicted influence of the disturbances acting in real conditions on the transfer section.

The method according to the invention is also suitable for checking the completely set up network, the processes in the network then being analyzed with respect to time and evaluated statistically. As a result, it can be determined in the particular application in a real environment whether the network design meets the requirements made, under real conditions. Furthermore, faults of the network can be discovered and localized, so that the implementation of diagnosis and maintenance of networks is possible. In this case as well, the data signals transferred to the data path must be conditioned. As, in the analyzing case, the data signals being, for example, generated by controllers or microprocessors, it cannot be readily determined, in a monitoring of the data transfer on the data path, at which point in time the transmission request for the corresponding data signal occurred. The evaluation, however, presupposes that the time of the transmission request is determined, as from this the delay occurring can be determined, taking into account the length in terms of time of the data signal and the completion of the transfer.

With a completely set up network, the time of the transmission request is therefore determined, taking into account the data signals transmitted directly around that time and, if known, their priority to establish whether a delay could have occurred at all. It can then be determined how great the delay could have been in the worst case. For the evaluation, recourse is preferable made, for the sake of safety, to the worst case, but it is also conceivable to use as a basis in each case an average delay, which is obtained from a mean between the delay in the best case and the delay in the worst case. The evaluation is preferably performed via memories at a substantially reduced rate in comparison with real time, in order to keep the evaluation effort low.

BRIEF DESCRIPTION OF THE DRAWINGS

The invention is to be explained in more detail below in reference to diagrams represented in the drawings, in which:

FIG. 7 shows a table for transfer processes on a data bus.

DETAILED DESCRIPTION OF THE PREFERRED EMBODIMENTS

Figure 1:
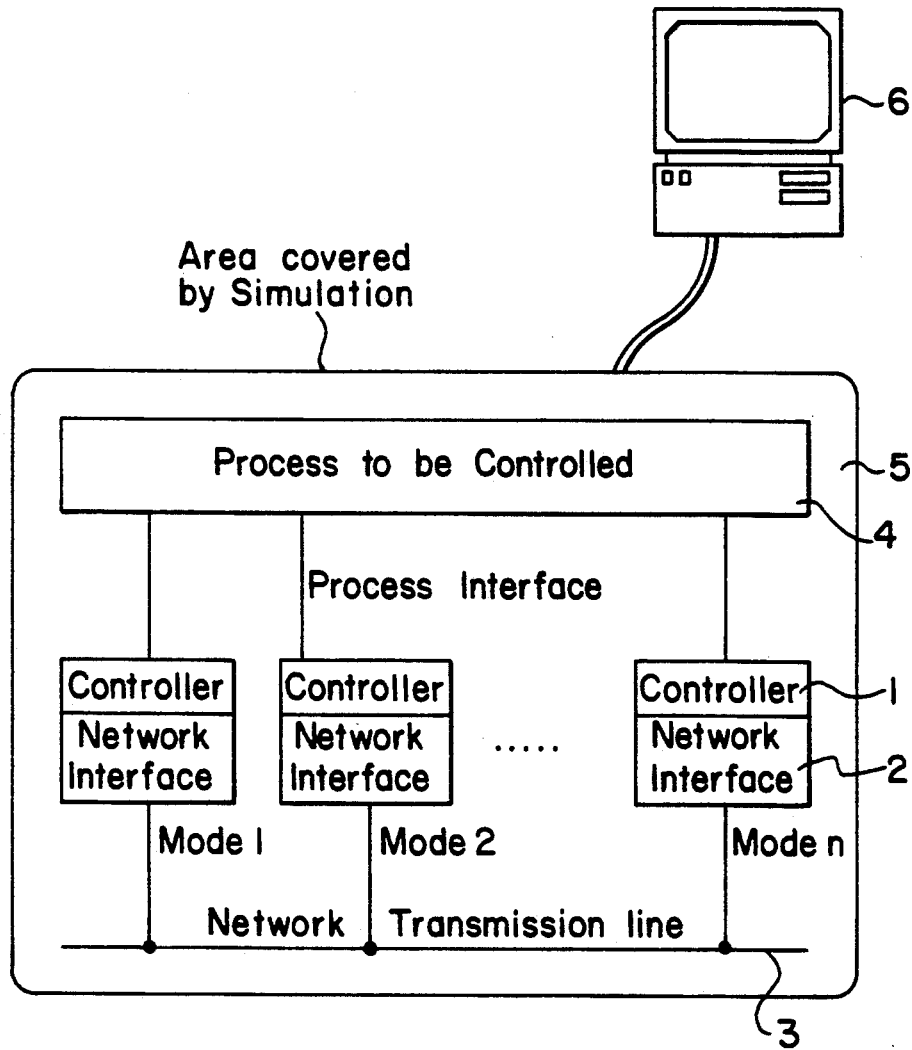
FIG. 1 shows a diagrammatic representation of a network, the functions of which are simulated for checking the network design.
Figure 2:
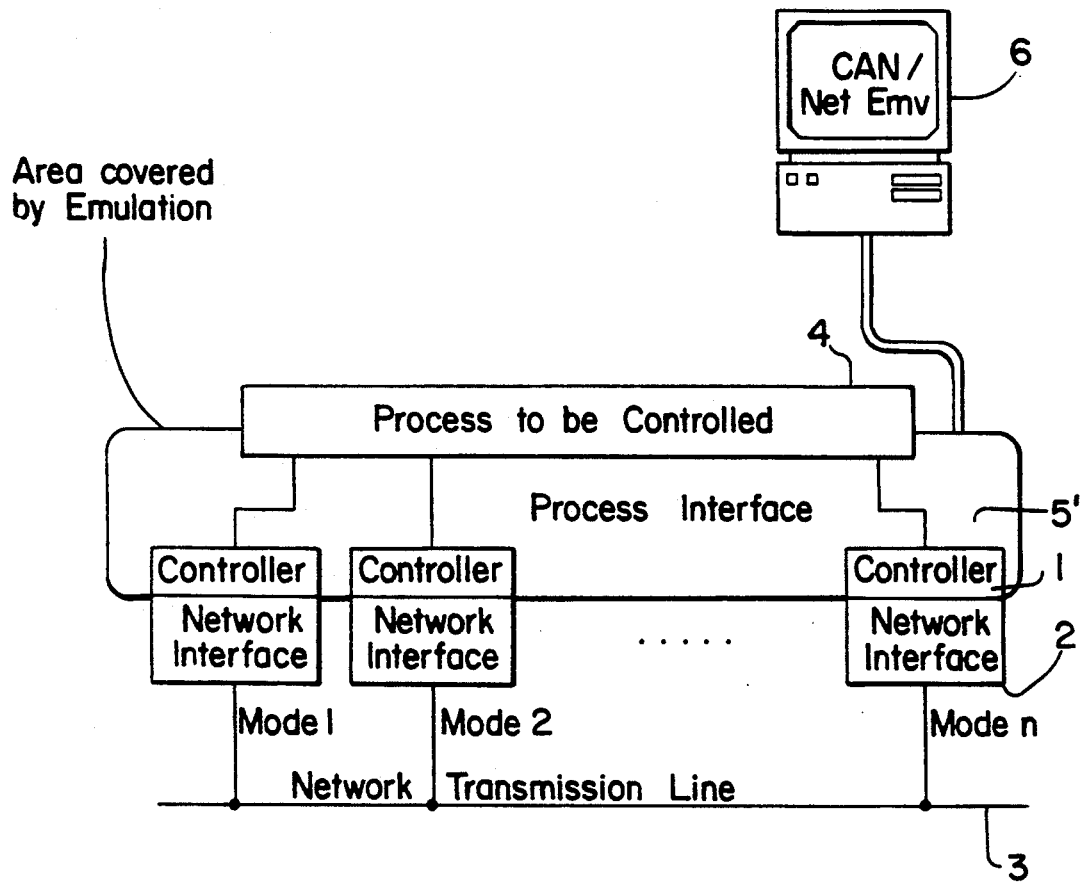
FIG. 2 shows a representation according to FIG. 1 for a network which is set up with its data but and the interfaces and the other functions of which are simulated in an emulator arrangement.
Figure 3:
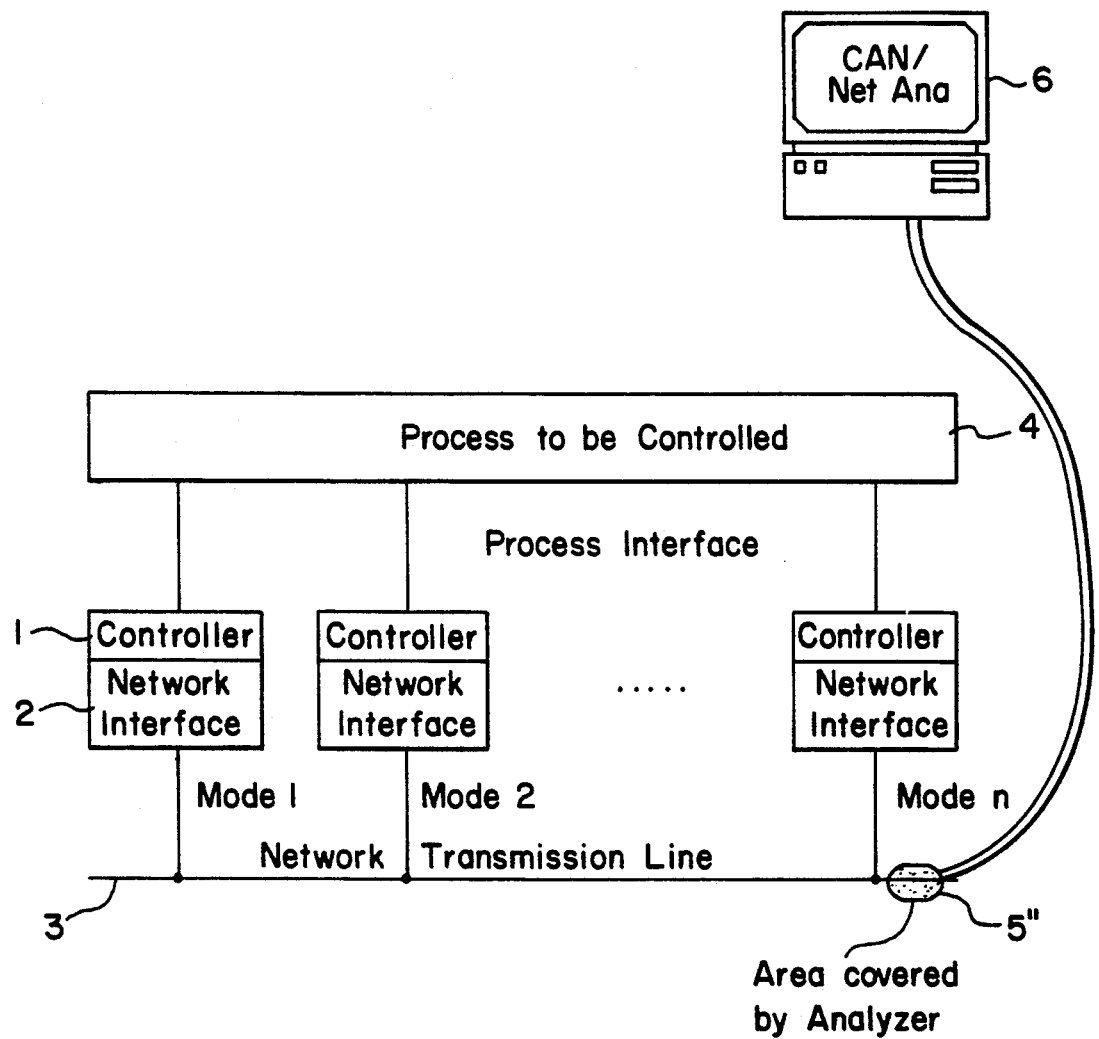
FIG. 3 shows an arrangement for the analysis of a completely setup network.

A network which is to be tested by the method according to the invention is represented diagrammatically in FIGS. 1 through 3. The network consists of a number of n controllers 1 as computers, which are in each case connected via an interface 2 to a data bus 3 as the data path. Controller 1 and interface 2 form a so called node of the network. The controllers 1 are generally capable both of transmitting data signals and of receiving and processing data signals. The controllers 1 respond jointly to a control 4, with which a system, for example the control and regulating processes in a motor vehicle, is controlled.

The shaded area 5, which in FIG. 1 comprises the entire network, illustrates that, in the exemplary embodiment represented in FIG. 1, a complete simulation of the entire network is performed, i.e., that the data signals are generated in a simulated manner, subjected to the priority criteria, and received by the control 4.

Figure 6:
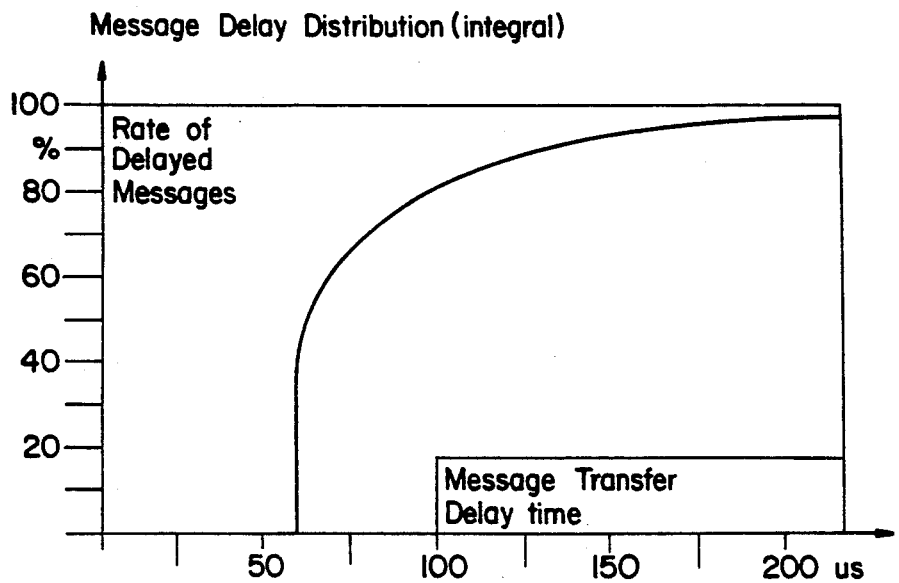
FIG. 6 shows a statistical distribution evaluation for the message transfer delays.

An evaluation arrangement 6 evaluates in the way described before the transfer processed on the data bus 3, dependent on the data signals generated and provided for transfer. Examples of evaluations are shown in FIGS. 6 and 7, which are explained in more detail below.

FIG. 2 illustrates a so-called emulation, in which the data bus 3 and the interfaces 2 have already been set up in terms of hardware, but the controllers 1 and the transfer to the control 4 are still simulated, as is illustrated by the shaded are 5'.

FIG. 3 shows an exemplary embodiment of the analysis of the completely set up network of controllers 1, interfaces 2, data bus 3 and control 4. The interface with the evaluation device 6 is performed by taking the data from the data bus 3, as is symbolically indicated by the small shaded area 5''.

Figure 4:
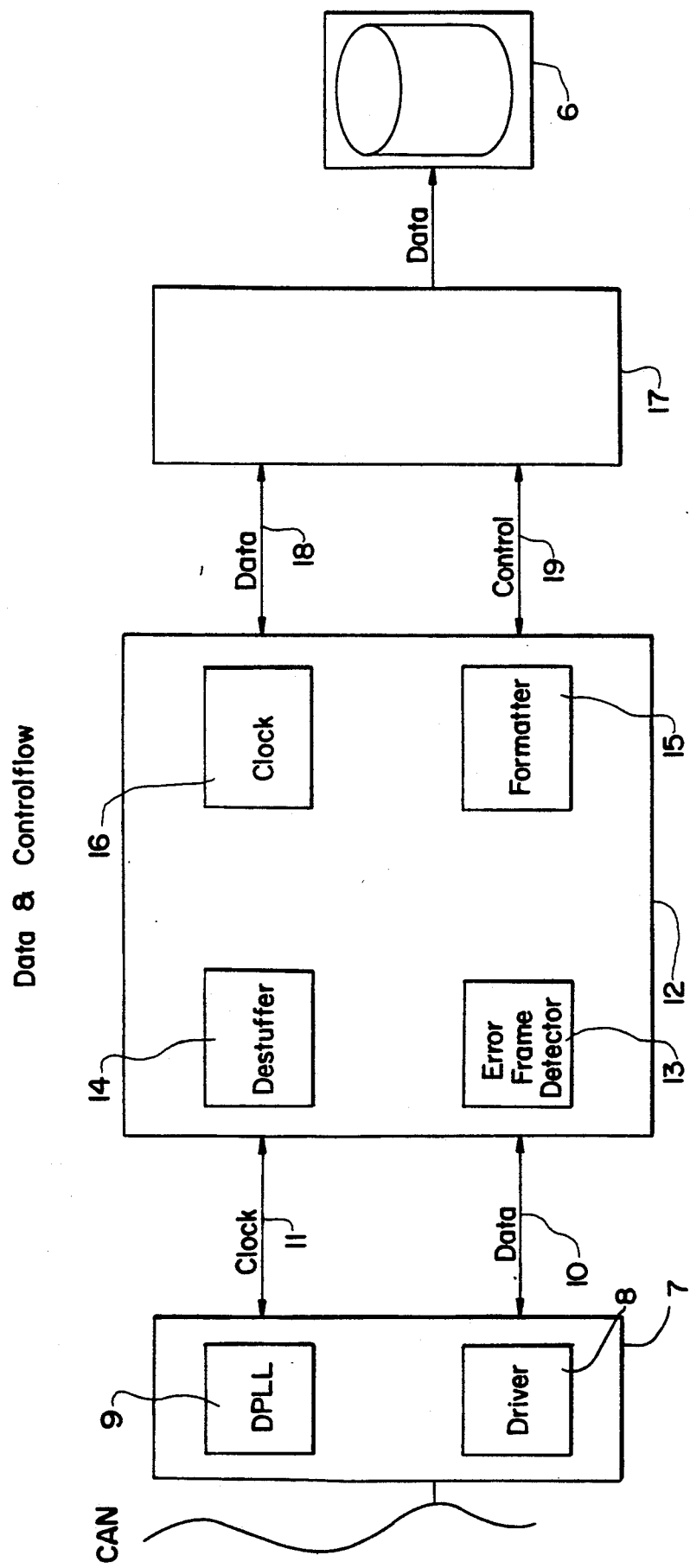
FIG. 4 shows a diagrammatic representation of the signal conditioning for a statistical evaluation.

FIG. 4 diagrammatically shows the data conditioning for the data flow on a data bus 3 of a CAN network.

The signal taken is conditioned in a signal conditioning stage 7, which has a driver 8 for signal shaping and amplification and a digital phase locked loop DPLL 9 for synchronization. At the output of the signal conditioning stage 7 there is a data signal 10 and a clock signal 11. The signals 10, 11 pass to a data conditioning stage 12, in which the data is first investigated for errors in an error detector 13, freed of bits additionally inserted for synchronization in a destuffer stage 14, and brought into a predetermined data format in a formatting stage 15. Furthermore, the data conditioning stage 12 incorporates a real-time clock unit 16, putting timing marks on to the transferred signals. The data conditioning stage 12 is adjoined by a memory stage 17, to which a data output 18 and a control line 19 of the data conditioning stage 12 pass. Control signals are exchanged between data conditioning stage 12 and memory stage 17 via the control line 19.

The memory stage 17 includes a first-in-first-out memory, via which the data, provided with timing marks, passes gradually to the evaluation unit 6.

Figure 5:
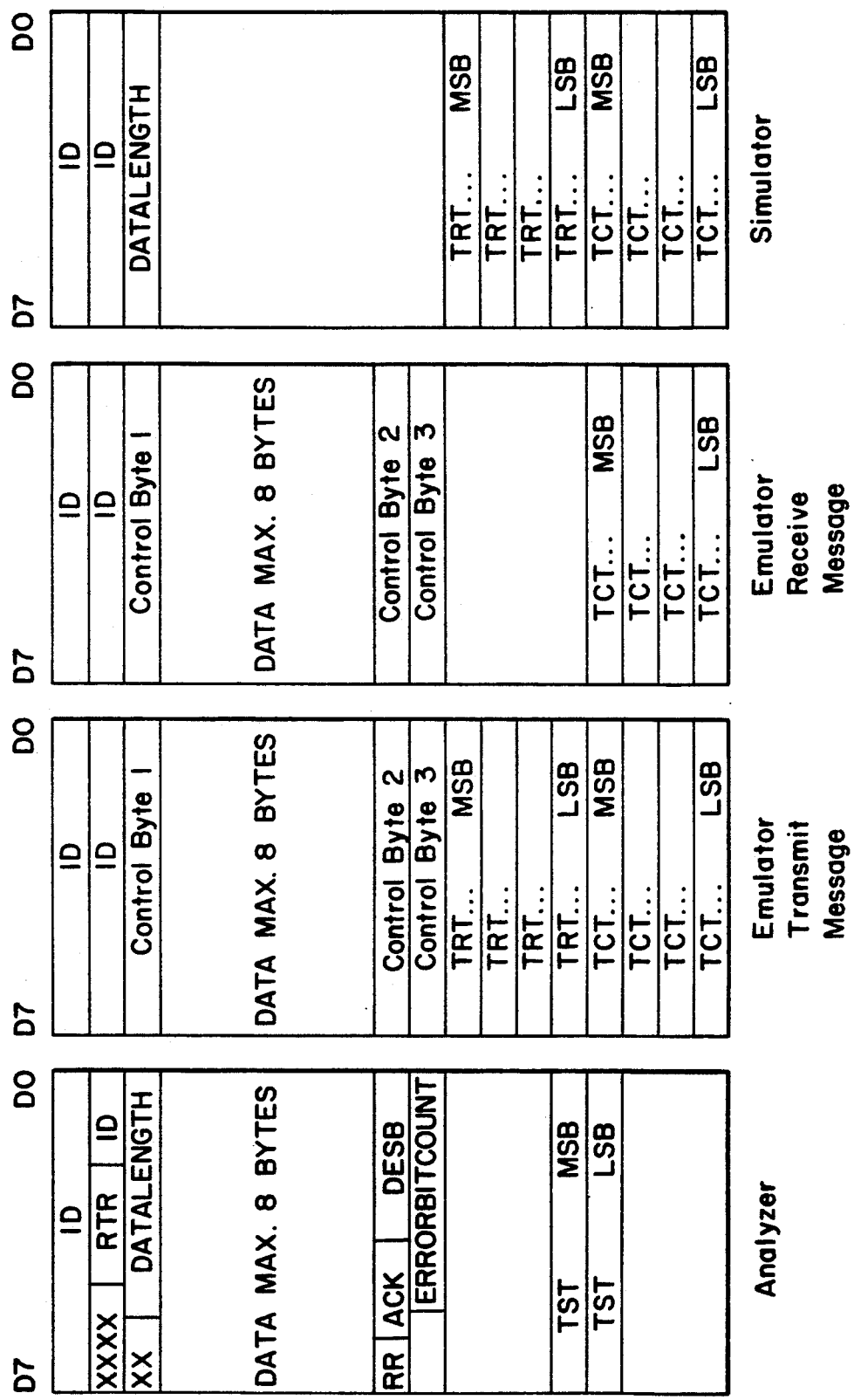
FIG. 5 shows four diagrams for the setup of data signals which can be used in the arrangement according to FIGS. 1 through 3.

FIG. 5 illustrates that substantially the same data formats are used for the analyzer operation (FIG. 3), the emulator operation (FIG. 2), and the simulator operation (FIG. 1). The data signals transferred in real conditions in the network are formatted as represented in FIG. 5 for the analyzer operation. They contain some identification symbols, the actual data, in the present case in a maximum of eight bytes, and a multiplicity of control data.

For the emulator operation, control bytes are used, which have a similar significance for controlling postprocessing and evaluation as the correspondingly defined control data parts in the analyzer operation. For the data transmitted, time stamps TRT and TCT are distributed for the transmission request time and for the reception time. The time stamps TRT and TCT for the time of the transmission request and of reception, respectively, extend over four bytes from the MSB (most significant byte) to the LSB (lowest significant byte). For the controllers only receiving a data signal, the time stamps for the transmission time are omitted.

In the analyzer operation, the data signal can be replaced only by the time stamp TST, which in the exemplary embodiment represented only consists of two bytes because it only contains a relative time. In any case that time is recognized to be measured which is determined by the end of a data signal transmission, that point of time corresponds most likely to time mark TCT of the simulator or emulator operation. It would also be conceivable to measure the end of the data signal. The time of the transmission request, which is required for evaluation, must be established indirectly. For this, best and worst assumptions can be made on the basis of the analyzed data flow on the data bus 3 and the corresponding times determined. The evaluation is preferably based on the worst time and from this the timing mark TRT, or the delay on which the evaluation is based, is determined. Depending on the application, there may also be other criteria for realistic assumptions for determining the probable delay.

FIGS. 6 and 7 show exemplary embodiments of the given network parameters, specifically 12 nodes in the case of a data bus with a bandwidth of 1 Mbit/s. In the example, 27 messages were to be transferred and transmitted at certain repetition rates.

FIG. 6 shows a curve on which it is specified what percentage of the messages can be transferred with which delay time. In the curve represented, just under 50% of the messages were transferred undelayed, i.e, in the time of 52 $\mu$s predetermined by the length of the data signal. The maximum transfer time was slightly over 200 $\mu$s. The statistical evaluation gives an average delay time of 86 $\mu$s. The statistical evaluation gives an average delay time of 86 $\mu$s and a bus occupancy for a single message of 5.38%. In this example, 275 data signals were transferred, only six cases of lost arbitration, in which the transmission had to be deferred due to priority criteria, having occurred. Further, 13 data signals were destroyed by noise, so that the transmission had to be repeated. Four data signals were delayed excessively.

The bus occupancy of 5.38% for an individual message specifies the proportion of this message in the overall load of the data bus. This value is an indication for the network designer to what extent alterations to the priority or the repetition rate of this message have an effect on the behavior of the overall system.

A value not shown here but expediently determined, for the overall bus occupancy, gives the network designer an indication whether the chosen bus bandwidth is dimensioned correctly, too generously or too small.

FIG. 7 shows the chronology for the transfer of the individual messages. In the first column, the time is specified at which the transfer should take place, in the second column the time at which the transfer has been completed. The third column contains the identification ID, which, in the example represented, at the same time contains the information on the relative priority. The comments in the fourth column explain the individual events.

The transfer at time 100 is without competition and takes place unproblematically. The transfer at time 370 could not take place because the data bus 3 was occupied by the transfer begun at time 350. When the transfer of 350 has been completed at time 440, the signal already waiting at time 370 could not be transferred with ID 25 because the network had to give priority to signal ID 10. Only after transfer of signal ID 10 could the transfer of signal ID 25 at time 610 be completed. At time 1230, signal ID 250 was destroyed by noise, so that a repetition was to take place at time 1260. At this time, however, signal ID 25 was given preference, because it had priority. Therefore, signal ID 250 could not be transmitted until time 1380 and was received by the controllers 1 at a time 1448.

The chronological evaluation according to FIG. 7 allows microscopically accurate assessment as to whether the essential processes for the control 4 have received the correct priority level, so that the control 4 receives the necessary data in the desired response time.

This makes it possible to reproduce accurately in detail why and to what extent a certain message was delayed at a certain time. Consequently, an individual error case can be analyzed and interpreted, in order then, if appropriate, to make corresponding modification to the network design.

The statistical evaluation according to FIG. 6 best reflects the overall behavior of the network. With the aid of these results, the essential parameters of the network, its transfer bandwidth and message priorities are established.

What is claimed is:

1. A method for testing a network setup having a plurality of data generators, data of which is to be transmitted and received over a data path and which is to be processed by a control, priority criteria being established for completing transfer of the data on the data path, comprising the steps of:
    generating data signals with a realistic frequency and subjected to the priority criteria;
    supplementing said data signals with timing marks;
    carrying out an evaluation using the timing marks to determine delay data of certain priority levels that can be transferred over the data path;
    setting up the data path with interfaces in a desired configuration;
    transferring the generated data signals over the data path; and
    conditioning said data signals so as to derive a synchronization clock synchronous with a transmitting data generator.

2. A method for testing a network setup having a plurality of data generators, data of which is to be transmitted and received over a data path and which is to be processed by a control, priority criteria being established for competing transfer of the data on the data path, comprising the steps of:
    setting up the data path with its interfaces for the data generators in a desired configuration in real hardware;
    generating data signals of simulated data generators with a realistic frequency;
    supplementing each data signal with a timing mark for the time of transfer request;
    subjecting said generated data signals to said priority criteria, and transferring said data signals over said setup data path;
    supplementing said data signals with a timing mark for the time of completion of the transfer;
    evaluating the delay occurring for the transfer of data signals with a defined priority rank over the data path by comparing said timing marks; and
    generating noise signals and processing said noise signals as signals with highest priority.

3. A method for testing a network setup having a plurality of data generators, data of which is to be transmitted and received over a data path and which is to be processed by a control, priority criteria being established for competing transfer of the data on the data path, comprising the steps of:
    setting up the data path with its interfaces for the data generators in a desired configuration in real hardware;
    generating data signals of simulated data generators with a realistic frequency;
    supplementing each data signal with a timing mark for the time of transfer request;
    subjecting said generated data signals to said priority criteria, and transferring said data signals over said setup data path;
    supplementing said data signals with a timing mark for the time of completion of the transfer;
    evaluating the delay occurring for the transfer of data signals with a defined priority rank over the data path by comparing said timing marks; and
    conditioning said data signals so as to derive a synchronization clock synchronization with a transmitting data generator.

4. A method for testing a network setup having a plurality of data generators, data of which is to be transmitted and received over a data path and which is to be processed by a control, priority criteria being established for competing transfer of the data on the data path, comprising the steps of:
    setting up the data path with its interfaces for the data generators in a desired configuration in real hardware;
    generating data signals of simulated data generators with a realistic frequency;
    supplementing each data signal with a timing mark for the time of transfer request;
    subjecting said generated data signals to said priority criteria, and transferring said data signals over said setup data path;
    supplementing said data signals with a timing mark for the time of completion of the transfer;
    evaluating the delay occurring for the transfer of data signals with a defined priority rank over the data path by comparing with timing marks; and
    providing the data with an additional bit for synchronization.

5. A method for testing a network setup having a plurality of data generators, data of which is to be transmitted and received over a data path and which is to be processed by a control, priority criteria being established for completing transfer of the data on the data path, comprising the steps of:
    generating data signals with a realistic frequency and subjected to the priority criteria;
    supplementing said data signals with timing marks;
    carrying out an evaluation using the timing marks to determine delay data of certain priority levels that can be transferred over the data path;
    setting up the data path with interfaces in a desired configuration;
    transferring the generated data signals over the data path; and
    providing the transferred data signals with a timing mark for the time of completion of the transfer by a receiving data generator.

6. The method according to claim 5, further comprising the step of:
    correcting an unequal running of various clocks of the data generators by comparison of the timing marks for the time of completion of the transfer of the same data signal from a transmitting data generator and at least one receiving data generator.

7. A method for testing a network setup having a plurality of data generators, data of which is to be transmitted and received over a data path and which is to be processed by a control, priority criteria being established for completing transfer of the data on the data path, comprising the steps of:

generating data signals with a realistic frequency and subjected to the priority criteria;

supplementing said data signals with timing marks;

carrying out an evaluation using the timing marks to determine delay data of certain priority levels that can be transferred over the data path;

setting up the data path with interfaces in a desired configuration;

transferring the generated data signals over the data path; and utilizing memories interfaced in front of an evaluation unit for carrying out said evaluation step, whereby the evaluation of the data signals occurs at a much slower rate compared with real time.

8. The method according to claim 7, further comprising the step of:

utilizing first-in-first-out memories as said memories.

9. A method for testing a network setup having a plurality of data generators, data of which is to be transmitted and received over a data path and which is to be processed by a control, priority criteria being established for competing transfer of the data on the data path, comprising the steps of:

setting up the data path with its interfaces for the data generators in a desired configuration in real hardware;

generating data signals of simulated data generators with a realistic frequency;

supplementing each data signal with a timing mark for the time of transfer request;

subjecting said generated data signals to said priority criteria, and transferring said data signals over said setup data path;

supplementing said data signals with a timing mark for the time of completion of the transfer;

evaluating the delay occurring for the transfer of data signals with a defined priority rank over the data path by comparing said timing marks; and evaluating data flows by utilizing memories interfaced in front of an evaluation unit, whereby the evaluation of the data signals occurs at a much slower rate compared with real time.

10. The method according to claim 9 further comprising the step of using first-in-first-out memories as said memories.

11. A method for testing a network setup having a plurality of data generators, data of which is to be transmitted and received over a data path and which is to be processed by a control, priority criteria being established for completing transfer of the data on the data path, comprising the steps of:

setting up said network comprising said data generators, said data path and interfaces between said data path and said data generators in real hardware;

generating said data signals by said data generators, said data signals being addressed to one or more data generators and provided with defined priority criteria;

allowing the transfer of said data signals over the data path; supplementing each of said data signals with a timing mark for the time of completion of the transfer by said receiving data generator; and calculating the probable time of the transfer request to the time of the reception of each transferred data signal by said receiving data generator in view of the preceding data flow on the data path and the priorities of data signals being transferred in a time interval before the reception of each data signal; and calculating the delay for data signals with predetermined priority ranks for their transfer over the data path by comparing the calculated probable time of transfer request and the time of completing the transfer.

12. The method according to claim 11, further comprising the step of:

providing each transferred data signal with a timing mark for the time of completion of the transfer by a receiving data generator.

13. The method according to claim 11, further comprising the step of:

evaluating data flows by utilizing memories interfaced in front of an evaluation unit, whereby the evaluation of the data signals occurs at a much slower rate compared with real time.

14. The method according to claim 11, further comprising the step of:

conditioning said data signals so as to derive a synchronization clock synchronous with a transmitting data generator.

15. The method according to claim 11, further comprising the step of:

performing the evaluation with an assumed time for the transmission request under worst conditions.

* * * * *